(12) United States Patent
Novorolsky et al.

(10) Patent No.: US 12,186,964 B2
(45) Date of Patent: Jan. 7, 2025

(54) GAS SHIELD FOR A BLOW/FILL/SEAL MACHINE

(71) Applicant: Weiler Engineering Inc., Elgin, IL (US)

(72) Inventors: Paul Novorolsky, DeKalb, IL (US); Alex A. Bazdor, Woodstock, IL (US)

(73) Assignee: Weiler Engineering, Inc., Elgin, IL (US)

( * ) Notice: Subject to any disclaimer, the term of this patent is extended or adjusted under 35 U.S.C. 154(b) by 58 days.

(21) Appl. No.: 18/195,183

(22) Filed: May 9, 2023

(65) Prior Publication Data
US 2024/0375340 A1    Nov. 14, 2024

(51) Int. Cl.
*B29C 49/42* (2006.01)
*B29C 49/46* (2006.01)
*B29C 49/58* (2006.01)

(52) U.S. Cl.
CPC ........ *B29C 49/58* (2013.01); *B29C 49/42808* (2022.05); *B29C 2049/4298* (2022.05)

(58) Field of Classification Search
CPC ........ B29C 49/42809; B29C 49/42808; B29C 2049/4298; B29C 49/4278; B29C 2049/4679; B65B 3/022
See application file for complete search history.

(56) References Cited

U.S. PATENT DOCUMENTS

| 2002/0171179 A1* | 11/2002 | Dundas | B29C 49/58 264/525 |
| 2016/0346988 A1* | 12/2016 | Remy | B29C 49/6445 |
| 2024/0131265 A1* | 4/2024 | Chew | B65B 3/022 |

FOREIGN PATENT DOCUMENTS

| CN | 106239877 A | * 12/2016 | |
| JP | 60049919 A | * 3/1985 | B29C 49/46 |
| WO | WO-2015109282 A1 | * 7/2015 | A61L 2/20 |

* cited by examiner

*Primary Examiner* — Robert B Davis
(74) *Attorney, Agent, or Firm* — Olson & Cepuritis, Ltd.

(57) ABSTRACT

A gas shield positionable over open parisons in a Blow/Fill/Seal machine prior to container forming, filling and sealing minimizes likelihood of particulate contamination of open parisons while the open parisons are transported to a container forming, filling and sealing station.

11 Claims, 7 Drawing Sheets

GAS SHIELD FOR A BLOW/FILL/SEAL MACHINE

FIELD OF INVENTION

This invention relates to Blow/Fill/Seal technology and in particular to a protective gas shield for extruded parisons in a Blow/Fill/Seal machine.

BACKGROUND OF THE INVENTION

Blow/Fill/Seal ("B/F/S") technology is a preferred technology for aseptic packaging of pharmaceutical and healthcare products. This packaging is a multi-step process of blow molding an extruded parison, forming a container, aseptically filling the formed container, and hermetically sealing the container in a single sequential operation in an automated machine. A thermoplastic material is heat extruded between mold parts, continuously in a tubular shape, through a circular throat to form a hanging tube referred to as a parison. When the extruded tube (parison) reaches a desired length, the mold closes around the parison and the parison is cut from the extruder. The bottom portion of the parison is pinched closed and the top is held open and in place with a set of holding jaws that are part of a mold assembly. The closed mold containing the parison is then transferred to a forming, filling and sealing station by a mold carriage.

Cutting of the parison usually involves the use of a heated moving cutter such as a hot wire or hot knife which melts through and severs the parison. A potential disadvantage associated with the use of a hot wire or the like expedient is the risk inherent in the generation or creation of parison particulates or vapor during the severance process and the deposit thereof within the interior of the ultimately formed, filled and sealed container.

The present invention provides a device and method which greatly reduces the generation or creation of contaminant particulates during the Blow/Fill/Seal process.

SUMMARY OF THE INVENTION

A gas shield in a Blow/Fill/Seal machine provides a protective gaseous envelope over open ends of extruded parisons and minimizes likelihood of particulate contamination during transfer to the filling and sealing process.

The gas shield for a Blow/Fill/Seal machine is adapted for attachment to a parison mold carriage of the Blow/Fill/Seal machine. The gas shield includes a base plate that carries a linear actuator which, by back-and-forth movement, positions gas-emitting nozzles over open parisons held in the mold carriage. The gas-emitting nozzles are in a gas flow communication with a gas manifold that, in turn, is operably associated with the linear actuator. The gas-emitting nozzles together with the gas manifold are positioned over the open parisons after extrusion from a rest position by action of the linear actuator.

Preferred shielding gas is sterilized air or sterilized nitrogen. A preferred linear actuator is a pneumatic linear actuator.

DETAILED DESCRIPTION OF PREFERRED EMBODIMENTS

This invention may be used in many different forms. The specification and the accompanying drawings disclose only exemplary embodiments of the present invention. The invention is not to be limited to the embodiments illustrated, however.

The precise shapes and sizes of the components herein described are not essential to the invention unless otherwise indicated.

For ease of description, the apparatus and method of this invention will be described in the normal (upright) operating position. Terms such as upper, lower, horizontal, etc., will be used in reference to this position. It will be understood, however, that the apparatus of this invention may be manufactured, stored, transported, used, and sold in an orientation other than the position described.

Use of the apparatus and method of this invention incorporates some of the method steps and apparatus disclosed in U.S. Pat. No. 4,707,966 to Weiler et al. The disclosures therein are incorporated herein by reference to the extent that such disclosures are pertinent and not inconsistent with the present specification.

Figure 1:
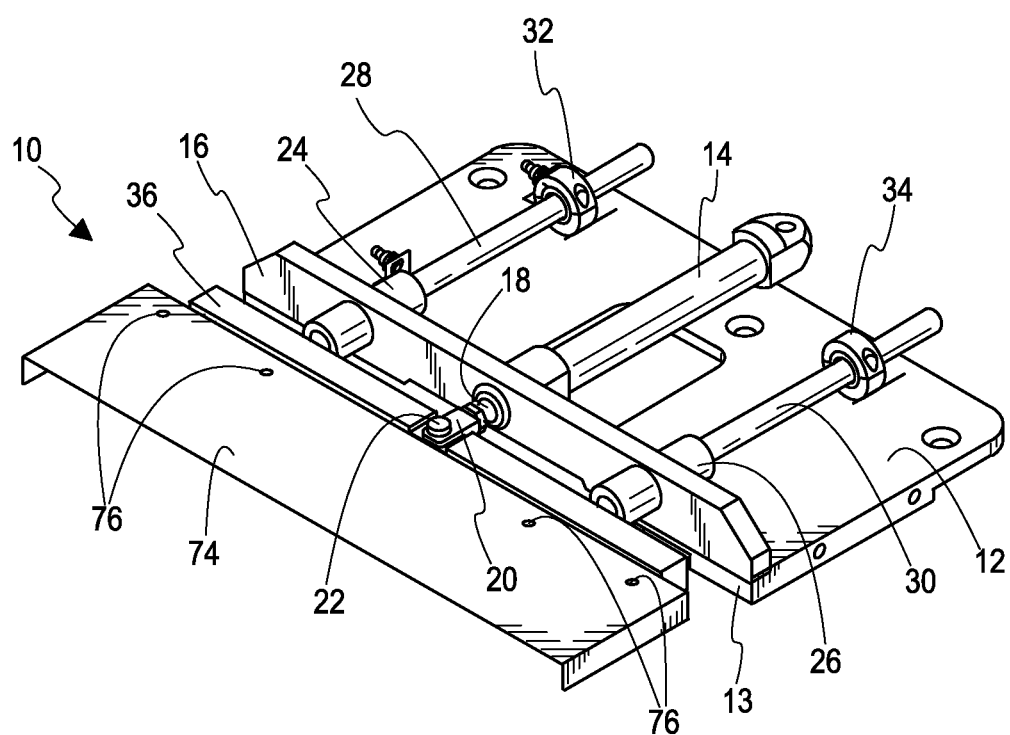
FIG. 1 is a perspective view of a gas shield embodying the present invention.
Figure 2:
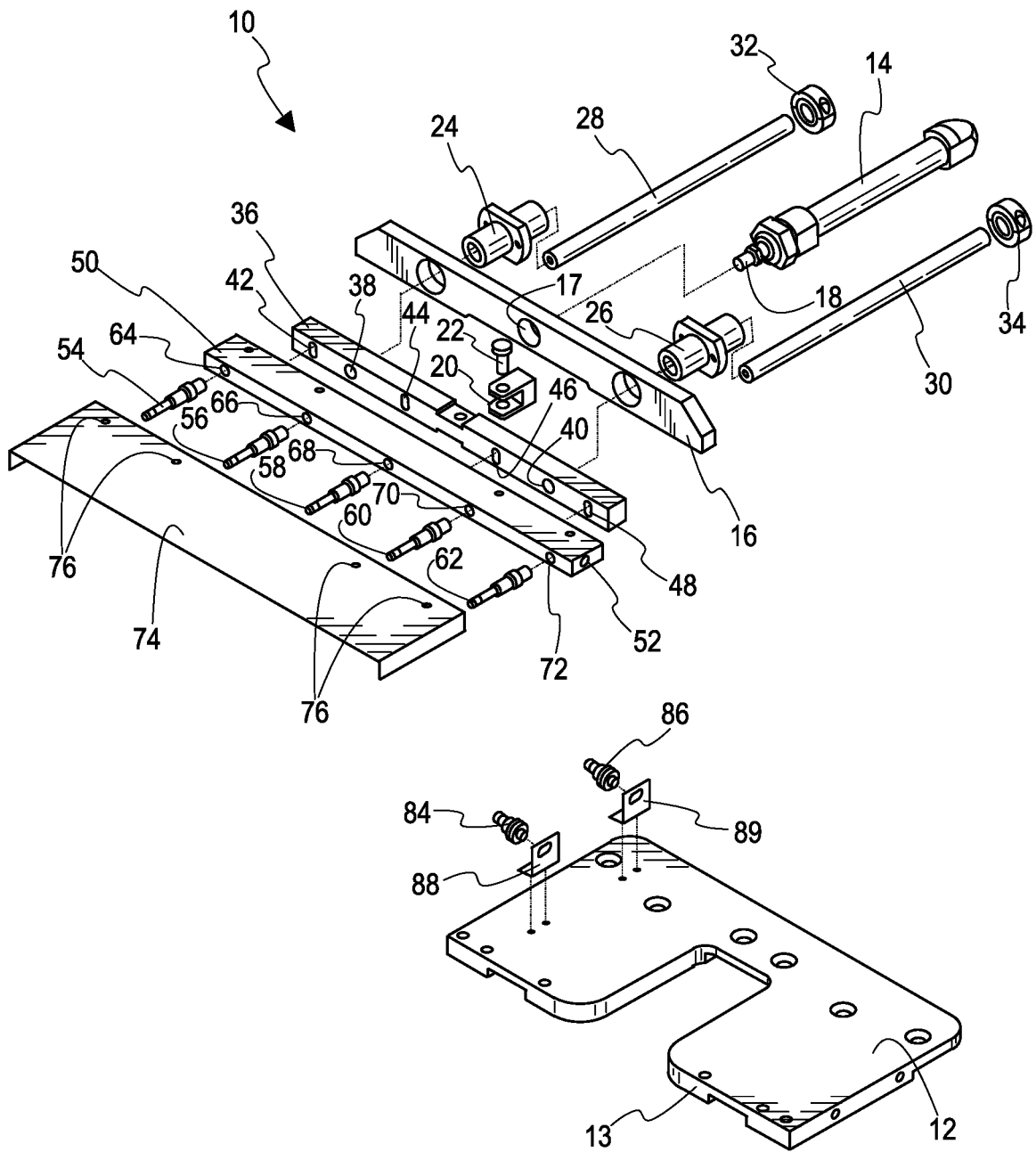
FIG. 2 is an exploded perspective view of the gas shield shown in FIG. 1.

Referring to FIGS. 1 and 2, gas shield 10 includes base plate 12 and elongated tie bar 16 attached thereto along leading edge 13 of base plate 12. Linear actuator 14, preferably a pneumatic linear actuator, is mounted to tie bar 16 so that a distal end portion 18 of a piston rod (not shown) in linear actuator 14 extends through aperture 17 (FIG. 2) beyond tie bar 16. A clevis fastener comprising clevis 20 and clevis pin 22 connects linear actuator 14 to manifold mounting bar 36.

Center flange bearings 24 and 26 are mounted in tie bar 16 flanking aperture 17 and distal end portion 18 on both sides Linear shafts 28 and 30 are mounted to base plate 12 by shaft collars 32 and 34. Linear shaft 28 is received in center flange bearing 24, extends therethrough, and a distal end portion of linear shaft 28 is received in bolt hole 38 of manifold mounting bar 36 and connected thereto. Likewise, linear shaft 30 is received in center flange bearing 26, extends therethrough, and a distal end portion of linear shaft 30 is received in bolt hole 40 of manifold mounting bar 36 and connected thereto. Linear shafts 28 and 30 are bolted with stainless steel socket head cap screws (not shown) to manifold mounting bar 36 via bolt holes 38 and 40 into taps at the ends of linear shafts 28 and 30. Linear shafts 28 and 30 stabilize the back-and-forth movement of manifold mounting bar 36 by the back-and-forth action of linear actuator 14.

Hollow gas manifold 50 supplies sterilized gas to gas dispensing nozzles 54, 56, 58, 60 and 62 and, in turn, is mounted to manifold mounting bar 36 by fasteners that extend from oblong apertures 42, 44, 46 and 48. Gas manifold 50 has tapped holes on the rear surface against manifold mounting bar 36. Oblong apertures 42, 44, 46 and 48 are slotted counterbored holes used to bolt together manifold mounting bar 36 and gas manifold 50 with stainless steel socket head cap screws (not shown). Gas inlet 52 in manifold 50 provides a connection to a shielding gas source such as sterilized air or sterilized nitrogen. For some applications, a shielding gas such as air filtered by a high efficiency particulate air (HEPA) filter may be adequate.

Gas dispensing nozzles 54, 56, 58, 60 and 62 extend from respective sockets 64, 66, 68, 70 and 72 provided in hollow gas manifold 50 having a shielding gas inlet 52, and are in operable gas flow communication with manifold 50 and a shielding gas supply to manifold 50. The number of gas nozzles can vary. Preferably, a gas nozzle is provided for each parison received in a main mold of a Blow/Fill/Seal machine. Air shield cover 74, also carried by manifold 50, extends over gas nozzles 54, 56, 58, 60 and 62. Air shield cover 74 can be opaque or transparent, as desired, and is secured to manifold 50 by fasteners 76.

Optional proximity sensors such as proximity sensor 84 in mounting bracket 88 and proximity sensor 86 in mounting bracket 89 can be provided on base plate 12 for monitoring the movement of gas shield 10.

In use, manifold 50 together with the gas dispensing nozzles and air shield cover 74 are positioned over open parison tops until the parisons are transported to a forming, filling and sealing station in the Blow/Fill/Seal machine.

Figure 3:
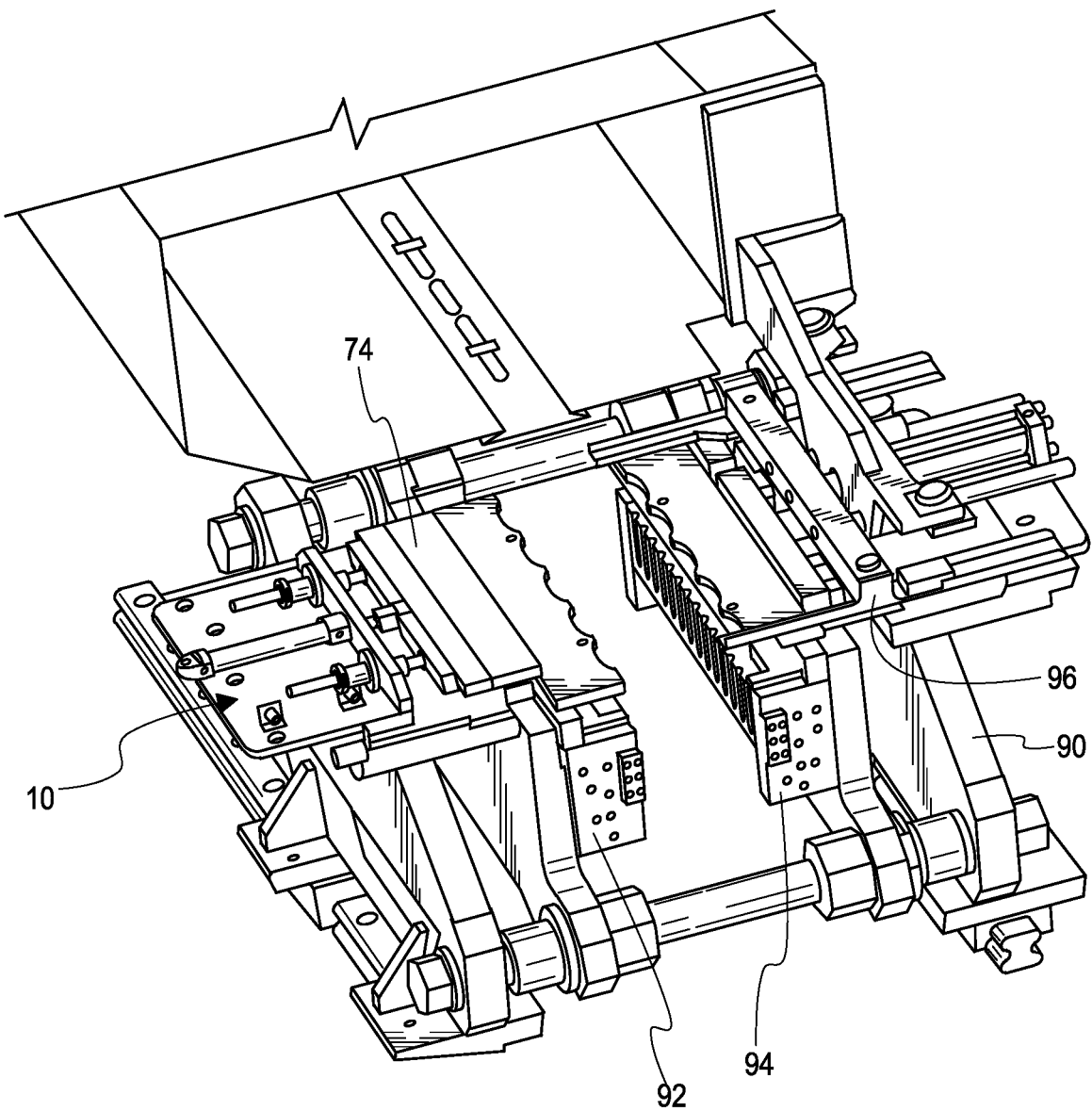
FIG. 3 is a perspective view of the gas shield of FIG. 1 mounted to a mold carriage shown with open main mold parts.
Figure 4:
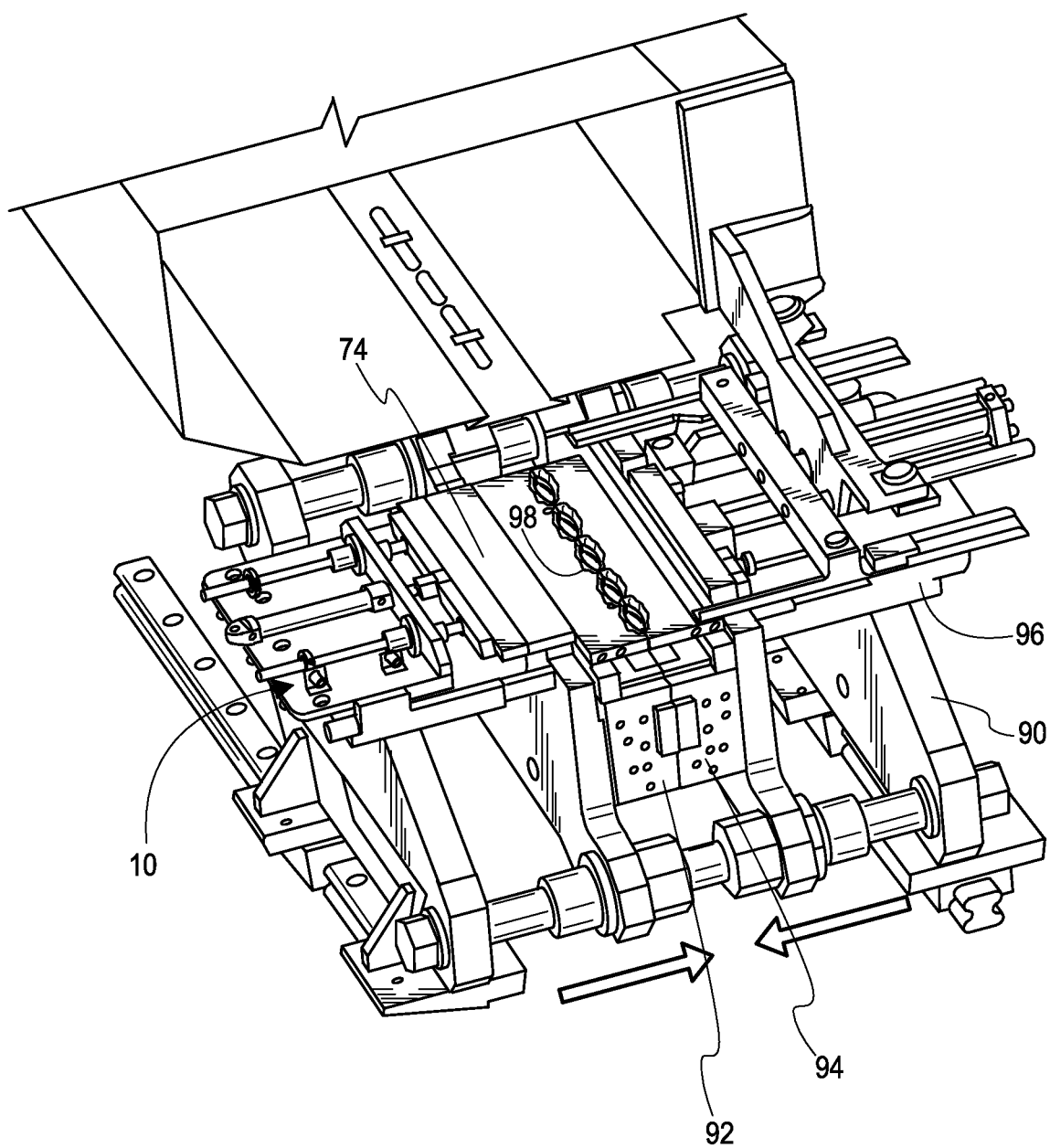
FIG. 4 is a perspective view of the gas shield of FIG. 1 mounted to a mold carriage shown with main mold parts closed around parisons.
Figure 5:
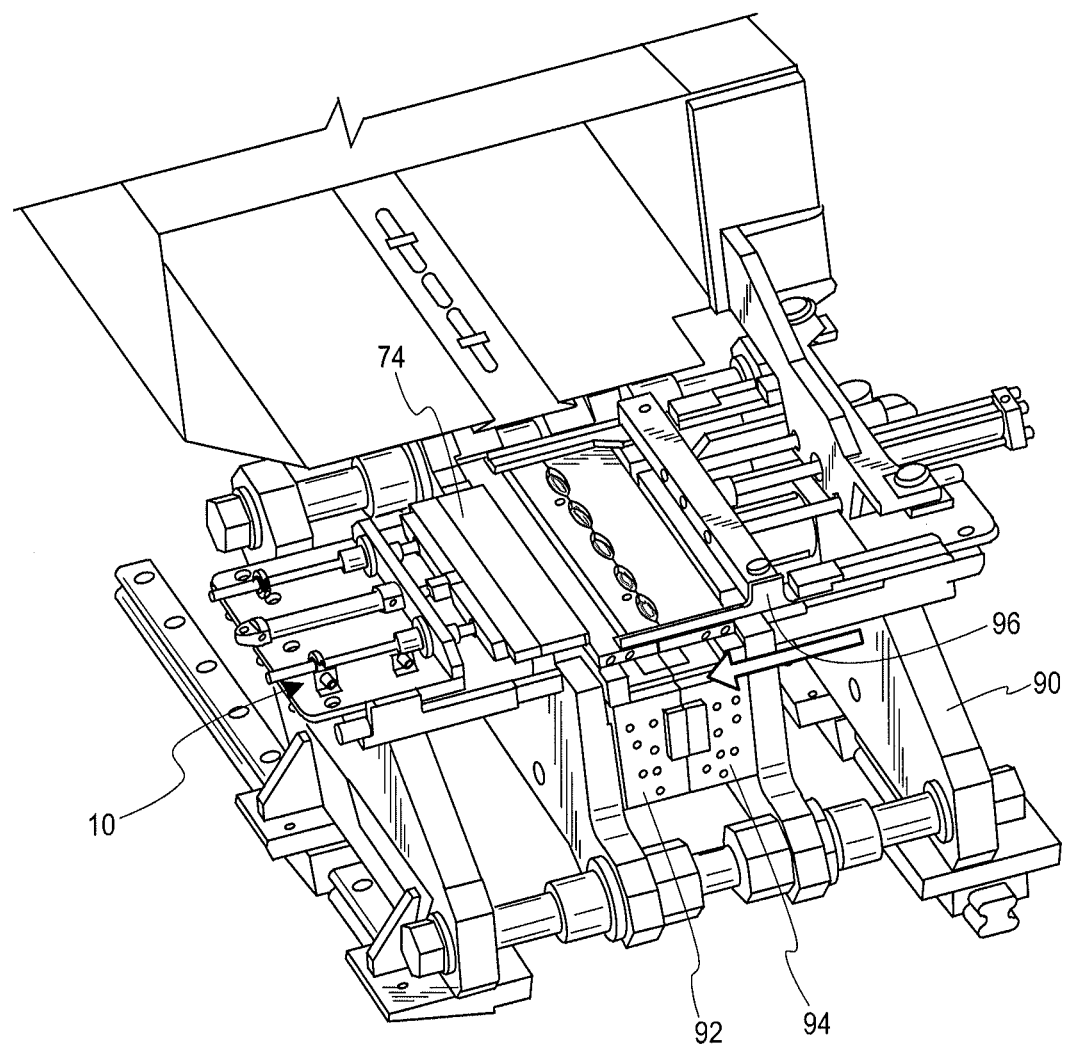
FIG. 5 is a perspective view of the gas shield of FIG. 1 mounted to a mold carriage shown with main mold parts closed around parisons, and a hot wire assembly extended past the parisons.
Figure 6:
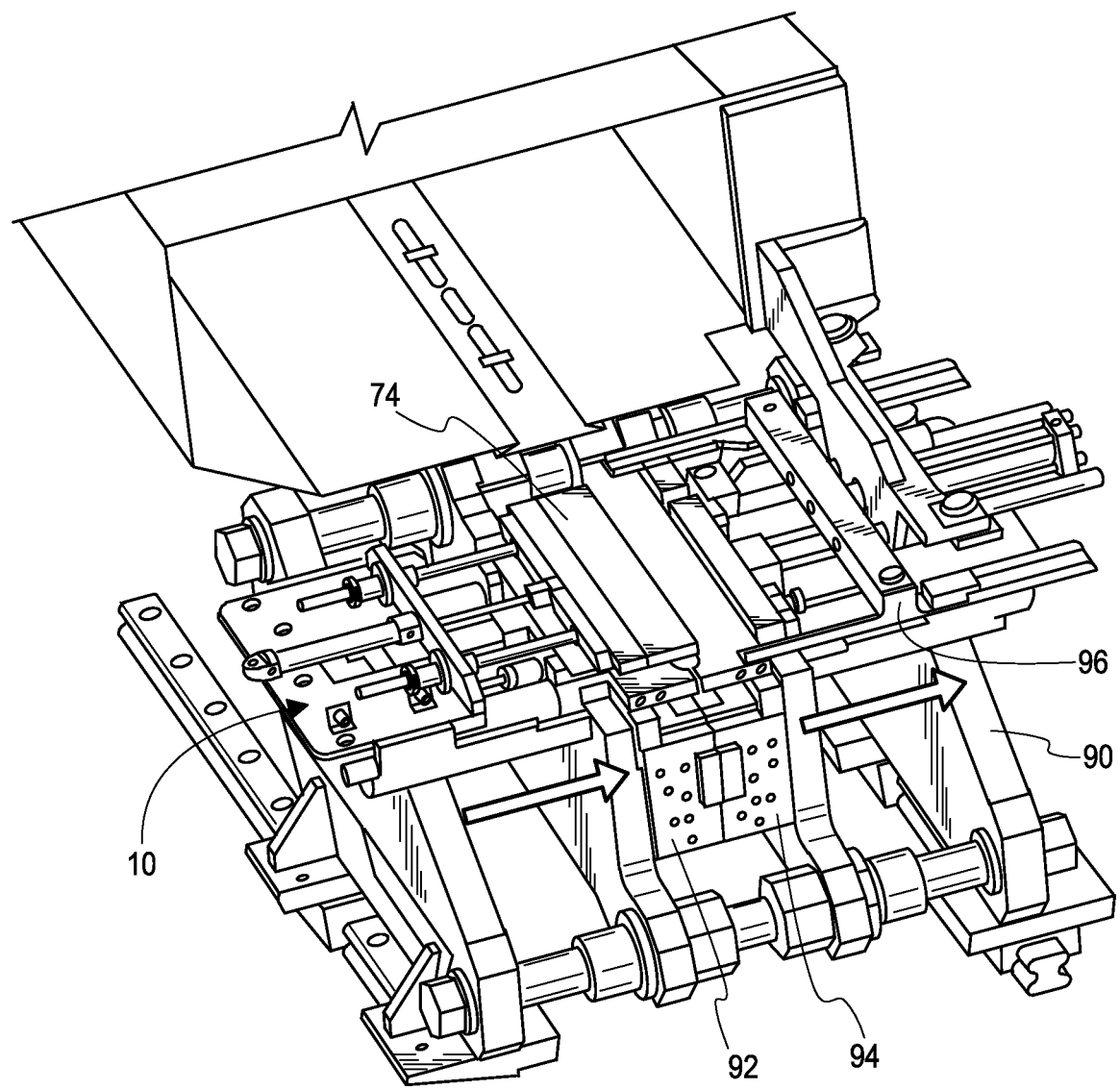
FIG. 6 is a perspective view of the gas shield of FIG. 1 mounted to a mold carriage shown with main mold parts closed, hot wire assembly retracted, and the gas shield positioned over open parisons.
Figure 7:
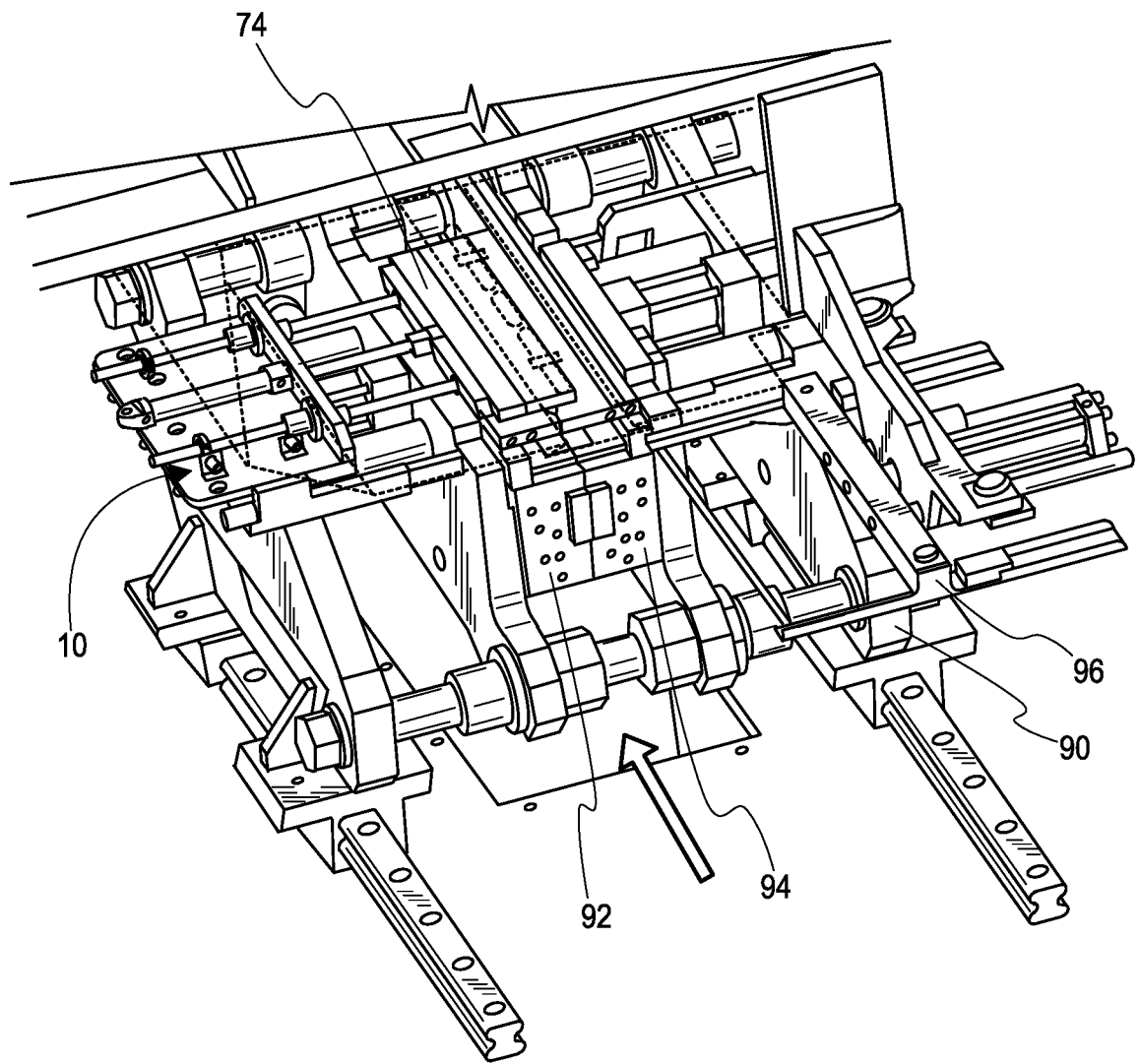
FIG. 7 is a perspective view of the gas shield of FIG. 1 mounted to a mold carriage shown with main mold closed and the gas shield positioned over open parisons while the mold carriage with open parisons is en route to a container forming, filling and sealing station.

FIG. 3 shows gas shield 10 mounted to mold carriage 90 of a Blow/Fill/Seal machine. Main mold parts 92 and 94 on mold carriage 90 are open and ready to receive parisons. FIG. 4 shows mold parts 92 and 94 closed around parison portions 98 that extend above closed mold parts 92 and 94. Closing of mold parts 92 and 94 seals a bottom portion of each parison. Parisons are held in place via mold holding jaws (not shown). Next, as shown in FIG. 5, hot knife assembly 96, mounted on mold carriage 90 opposite gas shield 10 is extended over closed mold parts 92 and 94, and parison portions are cut from the extruder of a Blow/Fill/Seal machine (not shown) while resulting individual open parison tops are held open by mold holding jaws (not shown). Thereafter, as shown in FIG. 6, hot knife assembly 96 is retracted, and gas shield 10 is extended over the open parison tops so that gas shield cover 74 is positioned directly over the open parison tops. Gas nozzles such as nozzles 54, 56, 58, 60 and 62 supply shielding gas into the open parison tops. Optionally, the shielding gas can be a hot shielding gas. In this manner, a gas shield, or curtain, provides a clean environment within each parison as the parisons with open tops are transported to a filling station as illustrated in FIG. 7. Inasmuch as gas shield 10 is mounted to mold carriage 90, gas shield cover 74 remains in position over open parison tops until a filling station is reached at which time gas shield 10 is retracted to initial position by linear actuator 14 as shown in FIG. 3.

The foregoing description and drawings are illustrative embodiments of the invention, but are not to be taken as limiting. Still other variants within the spirit and scope of this invention are possible and will readily present themselves to those skilled in the art.

The invention claimed is:

1. A gas shield for a Blow/Fill/Seal machine which comprises
    a base plate adapted for attachment to a parison mold carriage;
    a linear actuator carried by the base plate;
    a hollow gas manifold operably associated with the linear actuator for back-and-forth movement, defining a gas inlet and plural gas outlets;
    a gas nozzle operably associated with each gas outlet and in gas flow communication with the hollow gas manifold; and
    a gas shield cover attached to the hollow gas manifold and extending over the gas nozzle.

2. The gas shield in accordance with claim 1 and mounted to a mold carriage of a Blow/Fill/Seal machine.

3. The gas shield in accordance with claim 1 wherein the linear actuator is a pneumatic linear actuator.

4. The gas shield in accordance with claim 1 wherein the hollow gas manifold defines five gas outlets and wherein each gas nozzle is in gas flow communication with a corresponding gas outlet in said gas flow manifold.

5. The gas shield in accordance with claim 1 wherein the linear actuator is a pneumatic linear actuator and wherein said hollow gas manifold is connected to the pneumatic linear actuator by a clevis fastener.

6. The gas shield in accordance with claim 5 wherein the clevis fastener is a shackle.

7. The gas shield in accordance with claim 5 wherein the clevis fastener comprises a clevis and an associated clevis pin.

8. A gas shield for a Blow/Fill/Seal machine which comprises
    a base plate adapted for attachment to a parison mold carriage;
    an elongated tie bar attached to the base plate;
    a linear pneumatic actuator carried by the tie bar and having a piston rod with a distal end portion thereof extending beyond the tie bar;
    a clevis mounted to said distal end portion;
    a center flange bearing mounted in the tie bar on each side of the linear pneumatic actuator and spaced therefrom;
    a push rod received in the center flange bearing and extending through the elongated tie bar;
    an elongated manifold mounting bar received in said clevis, held in place by a clevis pin and defining a receptacle for receiving a distal end portion of the push rod;
    a hollow gas manifold attached to the manifold mounting bar, defining a gas inlet and a plurality of gas outlets;
    a gas nozzle mounted in each gas outlet and in gas flow communication with the hollow gas manifold; and
    a gas shield cover carried by the hollow gas manifold and extending over each said gas nozzle.

9. The gas shield in accordance with claim 8 and mounted to a mold carriage of a Blow/Fill/Seal machine.

10. The gas shield in accordance with claim 8 having a push rod on each side of the linear pneumatic actuator and spaced therefrom.

11. The gas shield in accordance with claim 8 wherein the hollow gas manifold defines five gas outlets and wherein each gas nozzle is in gas flow communication with a corresponding gas outlet in the hollow gas manifold.

* * * * *